April 12, 1932.   LE ROY C. DAVIDGE   1,853,301
REEL CONSTRUCTION
Filed Jan. 30, 1931
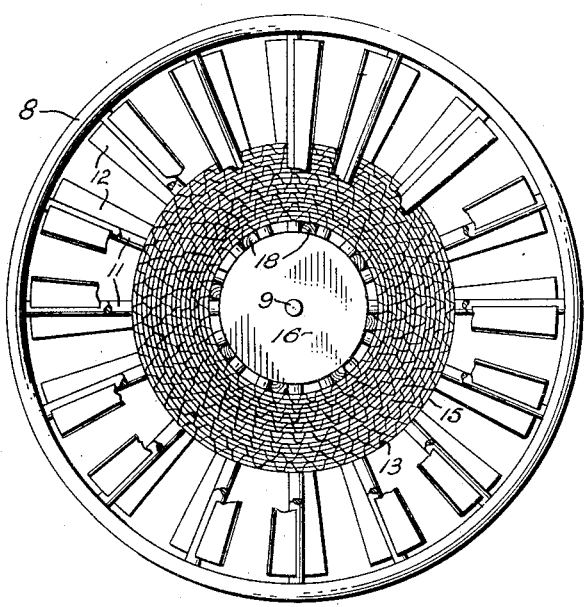
Fig. 1
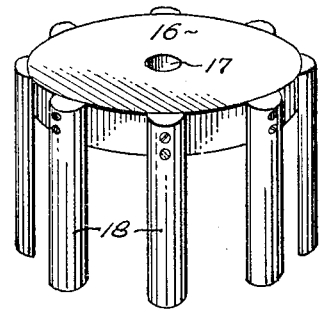
Fig. 3
Fig. 2
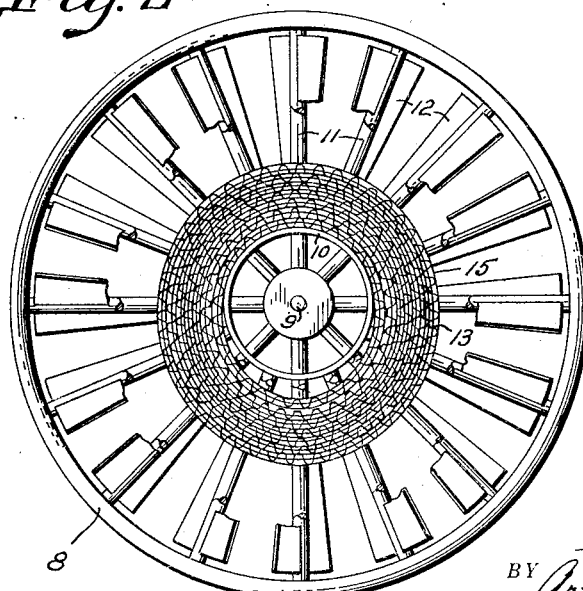
INVENTOR;
LeRoy C. Davidge,
BY Arthur J. Farnsworth.
ATTORNEY.

Patented Apr. 12, 1932

1,853,301

UNITED STATES PATENT OFFICE

LE ROY C. DAVIDGE, OF HOLLYWOOD, CALIFORNIA

REEL CONSTRUCTION

Application filed January 30, 1931. Serial No. 512,413.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

This invention relates to reel construction, and particularly to reels that are intended for use in developing and treating photographic films. Among its principal objects are; first, to provide a reel upon which one or more films may be wound under tension and having means whereby, after winding, the tension may be partially or wholly released throughout the whole coil; second, to provide a reel that permits of winding one or more films thereon and, after winding, of reducing the effective diameter of the drum so that the coil can float loosely therearound; third, to provide a reel that embodies a false drum or equivalent construction, co-axial with the reel, upon which one or more film strips may be wound, said drum or equivalent being removable after the coil has been completed; and, fourth, to accomplish the above mentioned objects by means of a simple and inexpensive construction.

My objects are attained in the manner illustrated in the accompanying drawings, in which:

Figure 1 is an elevation of a reel comprising two spaced spoked wheels having my invention applied thereto, and a pair of film strips wound thereon, certain portions of the spokes of the foremost side of the reel being broken away for convenience of illustration;

Figure 2 is an elevation of the above construction after my invention has been removed therefrom, showing the position the coil may assume in relation to the reel under these conditions; and Figure 3 is a perspective view of one form of spider or false reel drum that may be employed in cooperation with the other structural elements illustrated.

Similar reference numerals refer to similar parts throughout the several views.

In a joint application filed January 23, 1929 (Serial No. 334,438), by Arthur E. Reeves and myself, we illustrated and described a film developing process and apparatus therefor. Said application set forth means for treating coiled films in liquid baths, and the embodiment illustrated therein showed the same type of spoked reel that has been selected for the purpose of illustrating the present invention. In said joint application, it was mentioned that rotating the reel in one direction tended to tighten the coil windings, and that rotation in the other direction tended to loosen them. It was therefore recommended, for this reason and others, that the direction of rotation of the reel should be periodically reversed while the films thereon are being treated. I have now discovered that, by the use of the device constituting the present invention, it is unnecessary to reverse the direction of rotation of the reel, and that equally satisfactory results can be attained when the reel is rotated in one direction only. This gives an advantage in the saving of time, and in securing a somewhat greater uniformity of development or treatment of the film. It also has the further advantage that all portions of the film strips are relieved from tension during treatment.

My present invention consists in supplying a false and removable coil-carrying means that cooperates with the other elements of a reel, upon which a coil may be wound, and which may be removed from the reel after the coil is formed. Such removal has the immediate effect of loosening the coil upon the reel, and of removing all mechanical tension imposed upon the coil itself in winding. In the case of a film coil, it leaves the film in better form for treating in liquid baths or otherwise.

Where use is made of single sided reels, or of reels having a side that may be separated therefrom, my coil-carrying means may take the form of a cylinder, slatted structure, or equivalent construction. This may be slipped over the drum of the reel for the purpose of forming the coil, and then be removed therefrom by slipping it off the drum longitudinally. In the use of reels having fixed sides, it is necessary that one of these should be perforate for the purpose of utilizing my invention, and the coil-carrying means then necessarily takes the form of a slatted structure, of which the slats extend through the perforate side. The essence of the invention therefore resides in a coil-carrying means that effectively increases the diameter of the reel drum for the purpose of forming the coil, and that may then be removed, from the reel to leave the coil loosely surrounding the true drum of the reel.

The embodiment of my invention that I have selected for the purpose of this disclosure comprises the same type of reel structure shown and described in said joint application. This consists of a pair of spaced spoked wheels 8, mounted upon a common shaft 9, and includes a central drum or hub 10, extending between the wheels and co-axial with the shaft. The spokes of the wheels are indicated at 11 and, in the type of reel shown, these carry impeller blades 12. The latter are disposed at proper angles with the planes of the respective wheels, so as to cause them to force the liquid of treating baths between the layers of the coiled film, when the latter are spaced. The spacing of the leaves of the film may be accomplished in various ways, as by the use of the spacing strip 13 having protuberances on both sides thereof. This spacing strip is wound upon the reel with the film 15 that is to be treated, and serves to space the coils of the latter.

The form of my invention illustrated herein includes a spider having a circular disc 16 with a central hole 17, through which the shaft 9 may be passed and which snugly fits the shaft. A plurality of slats 18 are attached at one end to the periphery of the disc, and extend therefrom parallel to its axis. The diameter of disc 16 is the same or very slightly larger than that of drum 10, and slats 18 are so spaced that they may be inserated between spokes 11, as illustrated in Fig. 1. When thus inserted, the inner sides of the slats will be in contact with the periphery of drum 10, thus maintaining the spider in co-axial relation to the drum. The transverse dimensions of slats 18 is such as to permit them to pass between the spokes of the wheel with slight clearance, thus maintaining the angular position of the spider, with reference to the drum of the reel.

With the spider positioned upon the reel drum as just described, one or more film strips may be wound thereon in the usual manner. When the winding is completed, the spider may be pulled out of the film coil parallel to its axis, and leave the coil spaced from the reel drum. This immediately neutralizes mechanical tension on all parts of the film strip, and, if the inner and outer ends of the films are fastened to adjacent layers of the coil, there will be no possibility of the coil becoming tightened or loosened as the result of revolving the reel continuously in either direction. If the wound reel has its axis horizontal, the film coil will assume the position, with respect to the drum, that is illustrated in Fig. 2, as the result of gravity. In this position the coil as a whole will revolve at a slightly less speed than that of the reel, by reason of the difference between the diameter of the drum and the effective diameter of the interior of the coil. This has the advantage that the impeller blades 12 progressively change their positions with respect to the coil, thereby constantly changing the circulating paths of the treating liquid that is forced thereby transversely between the film coils. This will have a beneficial effect upon the uniformity of treatment of the thus coiled films in liquid baths.

It will be obvious from the foregoing that I have succeeded in producing a very simple device that will be found to be advantageous in securing functional results that hitherto could not be attained to the extent that this invention makes possible. Among such results are: the neutralization of mechanical tension due to winding a coil; the prevention of tightening or loosening the coil as the result of revolving its reel in one direction; and the constant change of location in transverse flow paths of treating liquid, when film coils are employed with the improved type of reel described.

Having thus fully described my invention, I claim:

1. In combination with a reel having a shaft with a protruding end, and a co-axial drum upon the shaft, unitary coil-carrying means comprising; a perforate disk co-axial with and centered by said shaft, and having a diameter substantially equal to the diameter of the drum; and slats affixed to the periphery of the disk and extending longitudinally therefrom over the periphery of the drum.

2. In combination with a reel having a perforate side member, a shaft with an end protruding beyond the side member, and a co-axial drum upon the shaft, unitary coil-carrying means comprising; a perforate disk through which said shaft extends, and having a diameter substantially equal to that of the drum; and slats affixed to the periphery of the disk and extending longitudinally therefrom through the perforate side member and over the periphery of the drum.

3. In combination with a reel consisting of spoked spaced wheels, a drum extending between the wheels, and a shaft with a protruding end, unitary coil-carrying means comprising; a disk having a central hole through which said shaft extends, and a diameter substantially equal to that of the drum; and slats affixed to the periphery of the disk and extending longitudinally therefrom between the spokes of one of said wheels and over the periphery of said drum.

LE ROY C. DAVIDGE.